United States Patent [19]  
Dörr et al.

[11] 4,438,050  
[45] Mar. 20, 1984

[54] METHOD FOR THE MANUFACTURE OF VERY DENSE OXIDIC NUCLEAR FUEL BODIES

[75] Inventors: Wolfgang Dörr, Herzogenaurach; Gerhard Gradel, Erlangen; Martin Peehs, Bubenreuth, all of Fed. Rep. of Germany

[73] Assignee: Kraftwerk Union Aktiengesellschaft, Mülheim, Fed. Rep. of Germany

[21] Appl. No.: 190,981

[22] Filed: Sep. 26, 1980

[30] Foreign Application Priority Data

Sep. 28, 1979 [DE] Fed. Rep. of Germany ....... 2939415

[51] Int. Cl.³ ............................................. G21C 3/62
[52] U.S. Cl. ..................................... 264/0.5; 252/638
[58] Field of Search ........................ 252/638; 264/0.5

[56] References Cited

U.S. PATENT DOCUMENTS

| | | | |
|---|---|---|---|
| 3,263,004 | 7/1966 | Bean | 252/638 |
| 3,344,081 | 9/1967 | Elyard et al. | 252/638 |
| 3,728,274 | 4/1973 | Gerontopoulos et al. | 252/638 |
| 3,917,768 | 11/1975 | Daga et al. | 252/638 |
| 4,052,330 | 10/1977 | Jensen et al. | 252/638 |

Primary Examiner—Deborah L. Kyle  
Attorney, Agent, or Firm—Herbert L. Lerner; Laurence A. Greenberg

[57] ABSTRACT

Manufacture of very dense oxidic fuel bodies of $UO_2$ with rare earth oxides in which pressed blanks are subjected to sintering in an oxidizing atmosphere at relatively low temperature and are sintered in a reducing atmosphere at a higher temperature. This avoids sintering-inhibiting phases and permits very dense bodies with greater content of rare earth oxides to be produced.

12 Claims, 1 Drawing Figure

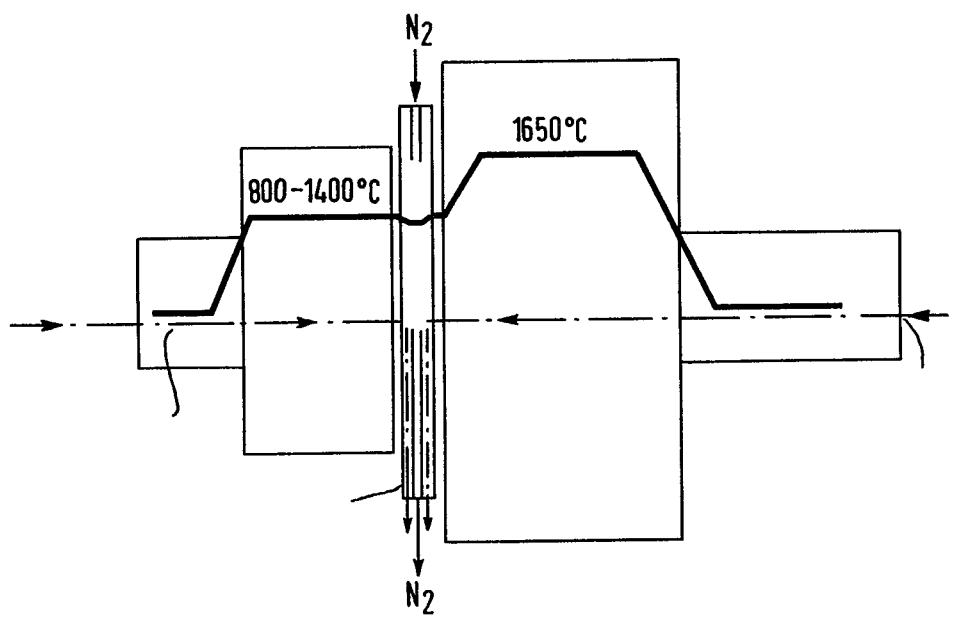

METHOD FOR THE MANUFACTURE OF VERY DENSE OXIDIC NUCLEAR FUEL BODIES

BACKGROUND OF THE INVENTION

1. Field of the Invention

The present invention relates to a method for the manufacture of very dense oxidic nuclear fuel bodies of $UO_2$ with additions of rare earth oxides such as gadolinium oxide. Such nuclear fuel bodies are required particularly for the fuel assemblies of nuclear light-water reactors; the rare-earth oxide, especially $Gd_2O_3$, plays the role of a burnable poison.

2. Description of the Prior Art

In sintering directly mixed uranium-gadolinium powders pressed without additions, it has been found that the sintering process deviates from that with pure $UO_2$ in important ways. In particular, the densities required in the range around 6% by weight can barely be achieved or maintained in spite of very long sintering times. Thorough investigations have shown that in the course of the sintering process, diffusion-stable and therefore sintering-inhibiting phases can form. This manifests itself particularly by the fact that the sintering densification takes place with delay in the temperature range above 1200° C. This effect is pronounced particularly with gadolinium contents around 6% by weight, but extends over the entire range of about 4 to 8% by weight.

Up to now, mainly $Gd_2O_3$ concentrations of 2 to 4% have been used in light-water reactors. Since, however, an increase of the concentration is desirable, especially in view of the use in fuel assemblies with high target burnup, the problem arose to find a sintering method with which it is possible to also obtain the higher weight contents of gadolinium oxide without the difficulties mentioned, especially with respect to the sintering density with controlled structure.

SUMMARY OF THE INVENTION

With the foregoing and other objects in view, there is provided in accordance with the invention a method which is characterized by the following steps:

(a) Mixing the nuclear fuel powder with up to 10% by weight powder of rare earth oxide, (b) pressing into blanks, (c) sintering in an oxidizing atmosphere at 800° to 1400° C. for a period of 15 minutes to 2 hours, and (d) sintering in a reducing atmosphere at temperatures above 1650° C. for a period of 30 minutes to 4 hours.

Other features which are considered as characteristic for the invention are set forth in the appended claims.

Although the invention is illustrated and described herein as embodied in a method for the manufacture of very dense oxidic nuclear fuel bodies, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing, in which is diagrammatically illustrated the flow of blanks through a sintering zone cocurrent with an oxidizing medium, then through a gas lock flushed with an inert gas, and then through another sintering zone at a higher temperature counter current to a reducing gas.

DETAILED DESCRIPTION OF THE INVENTION

By sintering in two temperature steps, the main densification processes can take place below the starting temperature for the mixed-crystal phases which form the solid solutions which inhibit the sintering. The overstoichiometric state adjusted by an oxidizing atmosphere largely prevents the formation of the sintering-inhibiting phases which can be formed in a reducing atmosphere and causes heavy densification at low temperatures via the activation of transport processes.

The sintering in the second step at temperatures of above 800° to 1400° C. to more than 1650° C. in a reducing atmosphere serves for setting the stoichiometry in the fuel. A fine adjustment of the density can be made via the holding time at temperatures above 1650° C.

For further explanation, the individual process steps will now be given once more together with the changes in the nuclear fuel caused thereby:

First, the starting powders of flowable $UO_2$, which was prepared, for instance, by the AUC process, and of rare earth oxides, specifically gadolinium oxide with concentrations of up to 10% by weight are mixed directly. This mixture is subsequently pressed into blanks without the need to add lubricants, binders or pore formers. It is possible, however, to admix dry-processed production runback directly up to 20% by weight, which has been annealed to form $U_3O_8$. This addition of scrap has a pore-forming effect in the finished sintered nuclear fuel and thereby permits a targeted control of the density as well as the setting of a suitable pore and grain structure of the sintered bodies.

These blanks are then placed in a two-zone sintering furnace, as is shown schematically in the drawing together with the temperature profile.

The sintering furnace is loaded on the low-temperature side which has temperatures of 800° to 1400° C., for instance, 1100° C. In this zone, an oxidizing atmosphere prevails, as for example $CO_2/CO$ mixtures or technically pure $CO_2$ (without repurification), which is fed into the furnace space, for instance, in the travel direction of the blanks. Formation of a solid solution which would have the effect of inhibiting the sintering, does not yet take place in this temperature range. This means that the overstoichiometric state set by the sintering conditions mainly causes the $UO_2$ particles to be sintered, but the added rare earth oxides remain largely untouched thereby.

Subsequently, the material to be sintered is pushed through a lock flushed with nitrogen into the second part of the furnace which is heated to above 1700° C., generally not higher than about 1900° C. There, a reducing atmosphere prevails, for example technically pure hydrogen or mixtures of hydrogen with dry or moistened inert gases, for instance, 8% $H_2$/92% $N_2$, as well as ammonia. These gases flow through the high-temperature zone, preferably against the travel direction of the bodies to be sintered. Their residence time in the high-temperature zone is varied between 30 minutes and 4 hours. The formation of solid solution of $UO_2$ and rare earth oxides takes place during this isothermal sintering process. The microstructure can be set via the sintering time.

The mentioned humidification of the reducing gas atmosphere is known and serves for better fluorine depletion in the nuclear fuel pellets.

The attached Table shows the sintering results obtained with this method as a function of the weight content of gadolinium oxide as well as of the holding times and temperatures in the two sintering stages.

Accordingly, the fuel bodies produced by this method attain high densities, in particular, more than or equal to 94% of theoretical density.

The densities obtained are largely independent of the concentration of the rear earth oxide, particularly the gadolinium oxide, in the concentration range 0 to 10% by weight.

The high sintering densities permit the addition of up to 20% $U_3O_8$ as a pore former and for controlling the density for a stable behavior during the burnup in the nuclear reactor.

From the above, it will be seen that the previous difficulties mentioned at the outset are practically eliminated by this relatively simple method.

TABLE

| (a) $UO_2/Gd_2O_3$ fuel body with x weight % $Gd_2O_3$ | (b) Temperature of the oxidizing sintering in °C. | (c) Holding time during the oxidizing sintering in minutes | (d) Temperature of the zone of reducing sintering in °C. | (e) Holding time during the reducing sintering in minutes | (f) Sintering density in $g/cm^3$ | (g) Sintering density in % of theoretical density |
|---|---|---|---|---|---|---|
| X = 4 | 1100 | 30 | 1750 | 120 | 10.52 | 97.4 |
| 4 | 1250 | 0 | 1750 | 120 | 10.41 | 96.4 |
| 5 | 1000 | 30 | 1750 | 240 | 10.24 | 95.2 |
| 5 | 1100 | 10 | 1750 | 240 | 10.25 | 95.2 |
| 6 | 950 | 60 | 1750 | 180 | 10.35 | 96.5 |
| 6.5 | 900 | 60 | 1750 | 240 | 10.33 | 96.5 |
| 6.5 | 1000 | 45 | 1750 | 180 | 10.33 | 96.5 |
| 6.5 | 1100 | 60 | 1750 | 240 | 10.36 | 96.8 |
| 7 | 920 | 60 | 1750 | 180 | 10.07 | 94.3 |
| 7 | 970 | 60 | 1750 | 180 | 10.12 | 94.7 |

There are claimed:

1. Method for the manufacture of very dense oxidic nuclear fuel bodies of $UO_2$ with additions of rare earth oxides which act as a neutron poison in the relatively large amount of more than 4% to 10% by weight, comprising the following steps:
   (a) Mixing of the nuclear fuel powder with more than 4% up to 10% by weight powder or rare earth oxide which acts as a burnable neutron poison,
   (b) pressing the mixture into blanks,
   (c) sintering the blanks in an oxidizing atmosphere at 800° to 1400° C. for a time of 15 minutes to 2 hours, and
   (d) sintering the blanks, which had been subjected to sintering in an oxidizing atmosphere, in a reducing atmosphere at temperatures above 1650° C. for a time of 30 minutes to 4 hours.

2. Method according to claim 1, wherein technically pure carbon dioxide gas is used as the oxidizing atmosphere.

3. Method according to claim 1, wherein said rare earth oxide is gadolinium oxide.

4. Method according to claim 1, wherein the reducing gas is selected from the group consisting of technically pure hydrogen, mixtures of hydrogen with dry inert gas and mixtures of hydrogen with inert gas and moisture.

5. Method according to claim 1, wherein the reducing gas is 8% $H_2$/92% $N_2$.

6. Method according to claim 1, wherein the reducing gas is $NH_3$.

7. Method according to claim 1, wherein up to 20% by weight $U_3O_8$ from sintering scrap is added to the starting powder for controlling the density.

8. Method according to claim 1, wherein sintering backrun of $(U,Gd)_3O_8$ is added for adjusting the pellet structure.

9. Method according to claim 1, wherein said oxidative and reducing sinterings are carried out in two separate sintering furnaces which are physically separated for cooling the material to be sintered.

10. Method according to claim 1, wherein said oxidative and reducing sinterings are carried out in a two-zone sintering furnace with an interposed gas lock flushed with inert gas.

11. Method according to claim 9 or claim 10, wherein the oxidizing gas flows in the direction of the material to be sintered in the low-temperature sintering zone, but against the travel of the material to be sintered in the high-temperature sintering zone.

12. Method according to claim 10, wherein nitrogen is the inert gas.

* * * * *